US012632335B2

(12) United States Patent
Huang et al.

(10) Patent No.: US 12,632,335 B2
(45) Date of Patent: May 19, 2026

(54) DATA STORAGE SYSTEM WITH ADAPTIVE FLASH MEDIA SCAN

(71) Applicant: SK hynix Inc., Icheon-si (KR)

(72) Inventors: Pengfei Huang, Milpitas, CA (US); Nan Lu, San Jose, CA (US); Fan Zhang, Fremont, CA (US)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/789,309

(22) Filed: Jul. 30, 2024

(65) Prior Publication Data

US 2026/0037373 A1 Feb. 5, 2026

(51) Int. Cl.
*G06F 11/10* (2006.01)

(52) U.S. Cl.
CPC ...... *G06F 11/1068* (2013.01); *G06F 11/1016* (2013.01)

(58) Field of Classification Search
CPC .......................... G06F 11/1068; G06F 11/1016
USPC ........................................................ 714/764
See application file for complete search history.

(56) References Cited

U.S. PATENT DOCUMENTS

| | | | |
|---|---|---|---|
| 11,705,215 B2 * | 7/2023 | Cadloni | G11C 29/44 |
| | | | 714/764 |
| 2013/0055046 A1 * | 2/2013 | Blodgett | G06F 11/0793 |
| | | | 714/764 |

| | | | |
|---|---|---|---|
| 2015/0324283 A1 * | 11/2015 | Lai | G11C 29/52 |
| | | | 714/764 |
| 2023/0195354 A1 * | 6/2023 | Liu | G06F 11/3409 |
| 2023/0205623 A1 * | 6/2023 | Hsu | G06F 11/0793 |
| | | | 714/764 |

FOREIGN PATENT DOCUMENTS

| | | | | |
|---|---|---|---|---|
| CN | 106233265 A | * | 12/2016 | .......... G06F 3/0605 |
| DE | 112016002631 T5 | | 2/2018 | |
| EP | 3491648 B1 | | 3/2021 | |

* cited by examiner

*Primary Examiner* — Esaw T Abraham
*Assistant Examiner* — Enam Ahmed
(74) *Attorney, Agent, or Firm* — Perkins Coie LLP

(57) ABSTRACT

Data storage systems and methods are disclosed. In some implementations, a method of operating a data storage system includes determining a program and erase cycle value of a particular memory area of a plurality of memory areas in the data storage system; determining a scan period corresponding to a cycle of a memory scanning operation based on the program and erase cycle of the particular memory area; determining a size of a list of memory pages of the particular memory area to be scanned within the determined scan period based on the program and erase cycle of the particular memory area; and performing the memory scanning operation by scanning memory pages corresponding to the determined size of the list of memory pages within the determined scan period.

20 Claims, 6 Drawing Sheets

Memory System

110

102
Memory Area

Memory Unit (e.g., block, page)

Memory Unit

Memory Unit

104
Memory Area

Memory Unit (e.g., block, page)

Memory Unit

Memory Unit

106
Memory Area

Memory Unit (e.g., block, page)

Memory Unit

Memory Unit

108
Memory Area

Memory Unit (e.g., block, page)

Memory Unit

Memory Unit

. . .

120
121  Memory Interface (e.g., NAND memory interface)

122  System Memory

123  Buffer/Cache

124  Processor

125  ECC Engine

126  Host Interface (e.g., SATA, PATA, SD, USB, PCLe)

402 — PEC Check

404 — Time Check

406 — $(Time\%t\_sp(PEC))==0$

408 — Initialize wpg_idx = 0

410 — Page = wpg_list(PEC)[wpg_idx]

412 — Test read a codeword in the page

414 — Decode failure?

Yes

416 — Perform read reclaim operation

No

418 — wpg_idx ++

420 — wpg_idx> Wpg_list Max Idx

No

Yes

422 — AFMS End

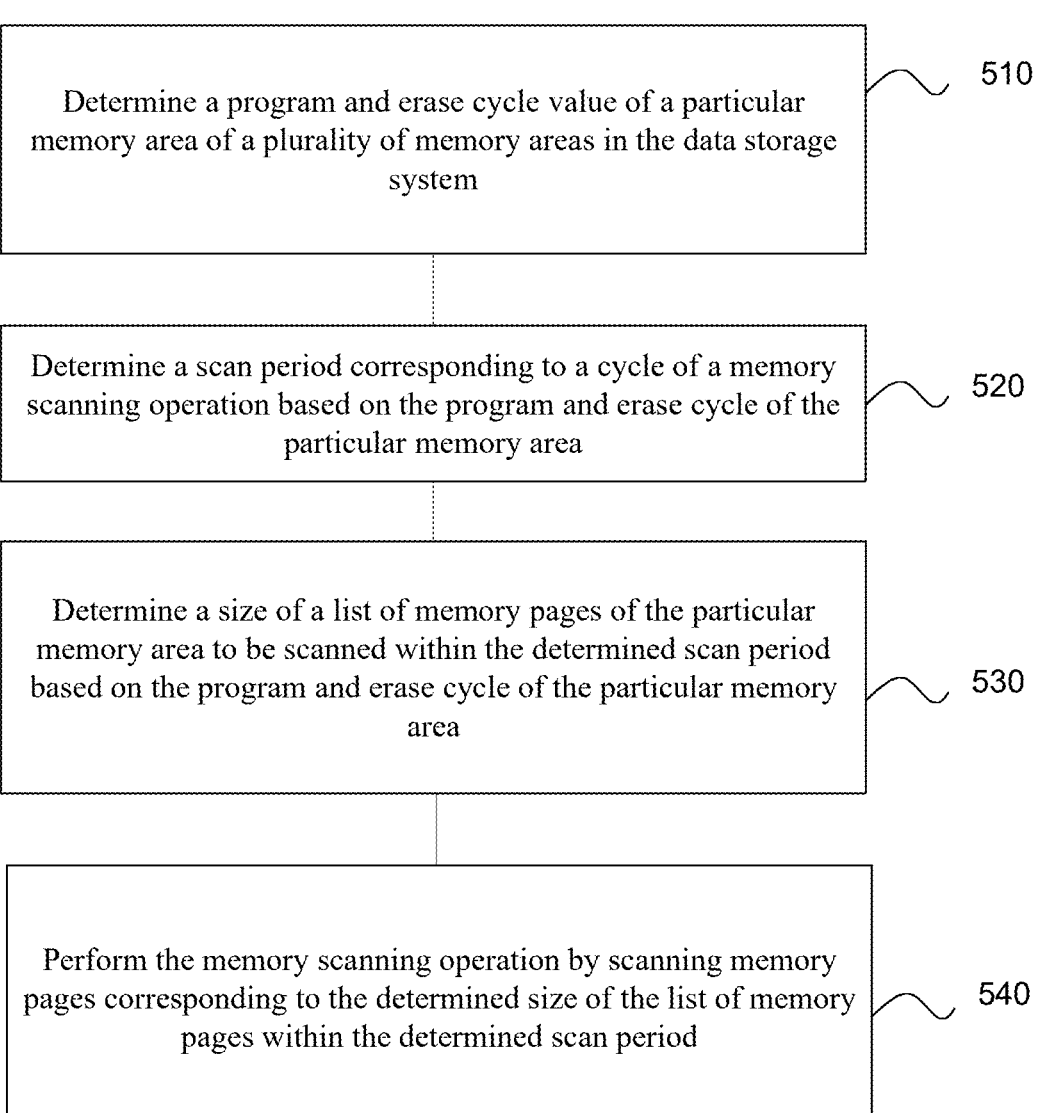

Determine a program and erase cycle value of a particular memory area of a plurality of memory areas in the data storage system

510

Determine a scan period corresponding to a cycle of a memory scanning operation based on the program and erase cycle of the particular memory area

520

Determine a size of a list of memory pages of the particular memory area to be scanned within the determined scan period based on the program and erase cycle of the particular memory area

530

Perform the memory scanning operation by scanning memory pages corresponding to the determined size of the list of memory pages within the determined scan period

DATA STORAGE SYSTEM WITH ADAPTIVE FLASH MEDIA SCAN

TECHNICAL FIELD

This patent document relates to interface devices for data storage systems.

BACKGROUND

Data storage systems such as solid-state drives (SSDs) are computer components or electronic systems that store data, such as the operating system, applications, and user files. Data retention refers to the ability of a data storage system to retain stored data without any loss or corruption over an extended period. Unlike traditional hard drives, SSDs use NAND flash memory to store data, which presents unique challenges related to data retention.

SUMMARY

The disclosed technology can be implemented in some embodiments to adjust the size of the pages to be scanned and the scan operation cycle based on the program and erase cycle (PEC) of the memory area.

In some embodiments of the disclosed technology, a data storage system includes: a plurality of memory areas configured to store data; and a controller coupled to a plurality of memory areas to control a memory scanning operation on the plurality of memory areas, wherein the memory scanning operation includes: determining a program and erase cycle value of a particular memory area of the plurality of memory areas; determining a scan period corresponding to a cycle of the memory scanning operation based on the program and erase cycle of the particular memory area; determining a size of a list of memory pages of the particular memory area to be scanned within the determined scan period based on the program and erase cycle of the particular memory area; and performing the memory scanning operation by scanning memory pages corresponding to the determined size of the list of memory pages within the determined scan period.

In some embodiments of the disclosed technology, a method of operating a data storage system includes determining a program and erase cycle value of a particular memory area of a plurality of memory areas in the data storage system; determining a scan period corresponding to a cycle of a memory scanning operation based on the program and erase cycle of the particular memory area; determining a size of a list of memory pages of the particular memory area to be scanned within the determined scan period based on the program and erase cycle of the particular memory area; and performing the memory scanning operation by scanning memory pages corresponding to the determined size of the list of memory pages within the determined scan period.

BRIEF DESCRIPTION OF THE DRAWINGS

FIG. 1 illustrates an example of a memory system that can be utilized for implementing some embodiments of the disclosed technology.

FIG. 5 is a flow diagram that illustrates a method of operating a data storage system based on some embodiments of the disclosed technology.

DETAILED DESCRIPTION

Figure 2:
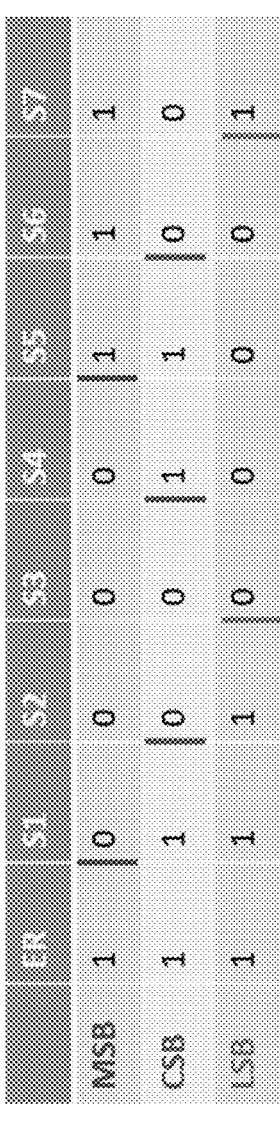
FIG. 2 illustrates examples of triple-level cell (TLC) page types and states based on some embodiments of the disclosed technology.

FIG. 1 illustrates an example of a memory system 100 that can be utilized for implementing some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, or 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a bank, block, or page that can be identified by a unique address such as bank address, block address, and page basis address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 111 can be configured to store at least one bit of information (e.g., one bit of information or multiple bits of information), and each of the memory cells in memory area 112 can be configured to store more than one bit of information.

As shown in FIG. 1, the memory system 100 includes a controller module 120. The controller module 120 includes a memory interface 121 to communicate with the memory module 110, a host interface 126 with communicate with a host (not shown), a processor 124 to executes firmware-level code, and buffers/caches and memories 122 and 123 to temporarily or persistently store executable firmware/instructions and associated information. In some implementations, the controller unit 120 can include an error correction engine 125 to perform error correction operation on information stored in the memory module 110. Error correction engine 122 can be configured to detect/correct single bit error or multiple bit errors. In another implementation, error correction engine 125 can be located in the memory module 110.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

The controller module 120 may include an error correction code (ECC) engine 125 that is configured to receive data to be written to the plurality of memory areas 102, 104, 106, 108 and to generate a codeword. For example, the ECC engine 125 may include an encoder configured to encode data using error correction codes such as a low-density parity check (LDPC) encoder.

The ECC engine 125 may also be configured to receive data and to process the received data using the error correction codes such as the LDPC decoder. The LDPC decoder may be configured to decode data read from the plurality of memory areas 102, 104, 106, 108 to detect and correct, up to an error correction capability of the ECC scheme, one or more bits of errors that are present in the data.

The disclosed technology can be implemented in some embodiments to adjust the size of the pages to be scanned and the scan operation cycle based on the program and erase cycle (PEC) of the memory area. In addition, the disclosed technology can be implemented in some embodiments to prevent the waste of unnecessary resources, compared to the static FMS algorithm and other adaptive FMS algorithms.

Figure 3:
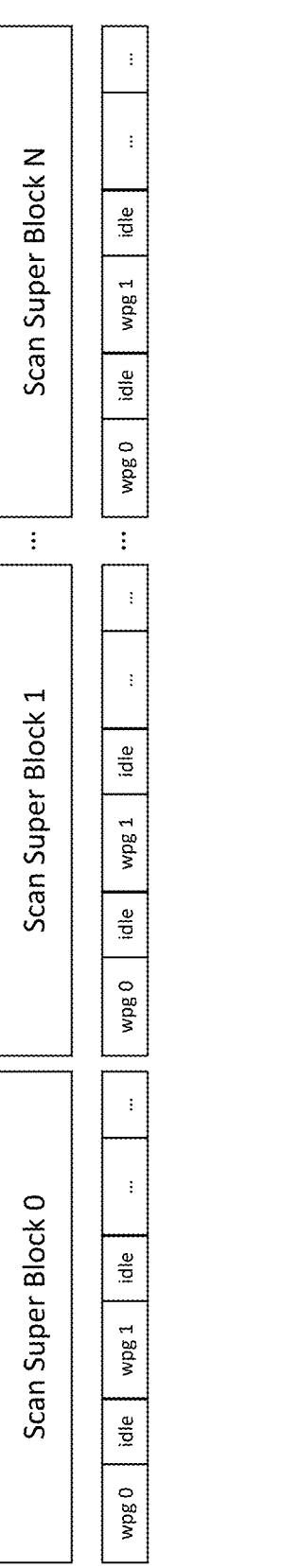
FIG. 3 illustrates an example of Flash media scan sequence.

FIG. 2 illustrates examples of triple-level cell (TLC) page types and states based on some embodiments of the disclosed technology. FIG. 3 illustrates an example of Flash media scan sequence.

Adaptive Flash Media Scan (AFMS) in solid-state drives (SSDs) is a technology designed to enhance the performance and reliability of NAND flash memory. In some implementations, this technology involves dynamically adjusting the behavior of the SSD to optimize operations like read, write, and erase based on real-time conditions and usage patterns.

SSD data integrity can be degraded as the retention period increases. Stored data should be maintained even after a certain time at a certain temperature. However, when multiple data bits are stored in a single memory cell, such as the high voltage state of the least significant bit (LSB) page of a triple-level cell (TLC) (e.g., S7 in FIG. 2), charge loss can increase the error rate. Another reliability issue is read disturb during idle time, which can cause the low voltage state (e.g., ER in FIG. 2) to exhibit a large erase tail, thereby increasing the error rate of the most significant bit (MSB) page.

To address these retention-related issues, some SSDs use a Flash media scan (FMS) mechanism that scans all the weak pages of the drive within a certain time period. However, in an example FMS algorithm, the scan period and scan page list are fixed throughout the entire lifespan of the SSD. If the same scan period and scan page list are applied at both the start of life (SOL) and the end of life (EOL) of the SSD. If the same scan period and scan page list are applied at both the start of life (SOL) and the end of life (EOL) of the SSD, the error rate can increase as the SSD approaches its EOL.

Although shortening the scan period and increasing the size of the weak page list can ensure drive reliability at EOL, for drives at SOL or those exhibiting much better NAND behavior than drives at EOL, such a static FMS algorithm can waste a lot of SSD resources at SOL stage and increase unnecessary power consumption. Additionally, a short Flash (e.g., foreground) media scan period can increase the probability of collisions with host traffic, thereby deteriorating the quality of service (QoS) of SOL, such as queue depth 1 (QD1) 4 KB random read QoS.

Generally, the QoS (Quality of Service) specifications for SOL (Start of Life) and EOL (End of Life) differ, with the QoS requirements for SOL being much more stringent than those for EOL.

To address these issues, the disclosed technology can be implemented in some embodiments to improve QoS by applying different scan periods for each stage of the SSD lifecycle. In some implementations, the scan period is set longer at SOL and gradually shortens as the program and erase cycles (PECs) increase. In addition, the disclosed technology can be implemented in some embodiments to improve QoS by setting the weak page indices differently according to the PECs. Furthermore, the disclosed technology can be implemented in some embodiments to improve QoS by using different weak page list sizes depending on the PECs. At the SOL, the list size is smaller, resulting in fewer weak pages. In this way, the scan period is longer and the weak page list size is smaller at SOL compared to the EOL, and SSD performance and power efficiency can be significantly enhanced at SOL. This is particularly important for next-generation enterprise SSD applications.

Figure 4:
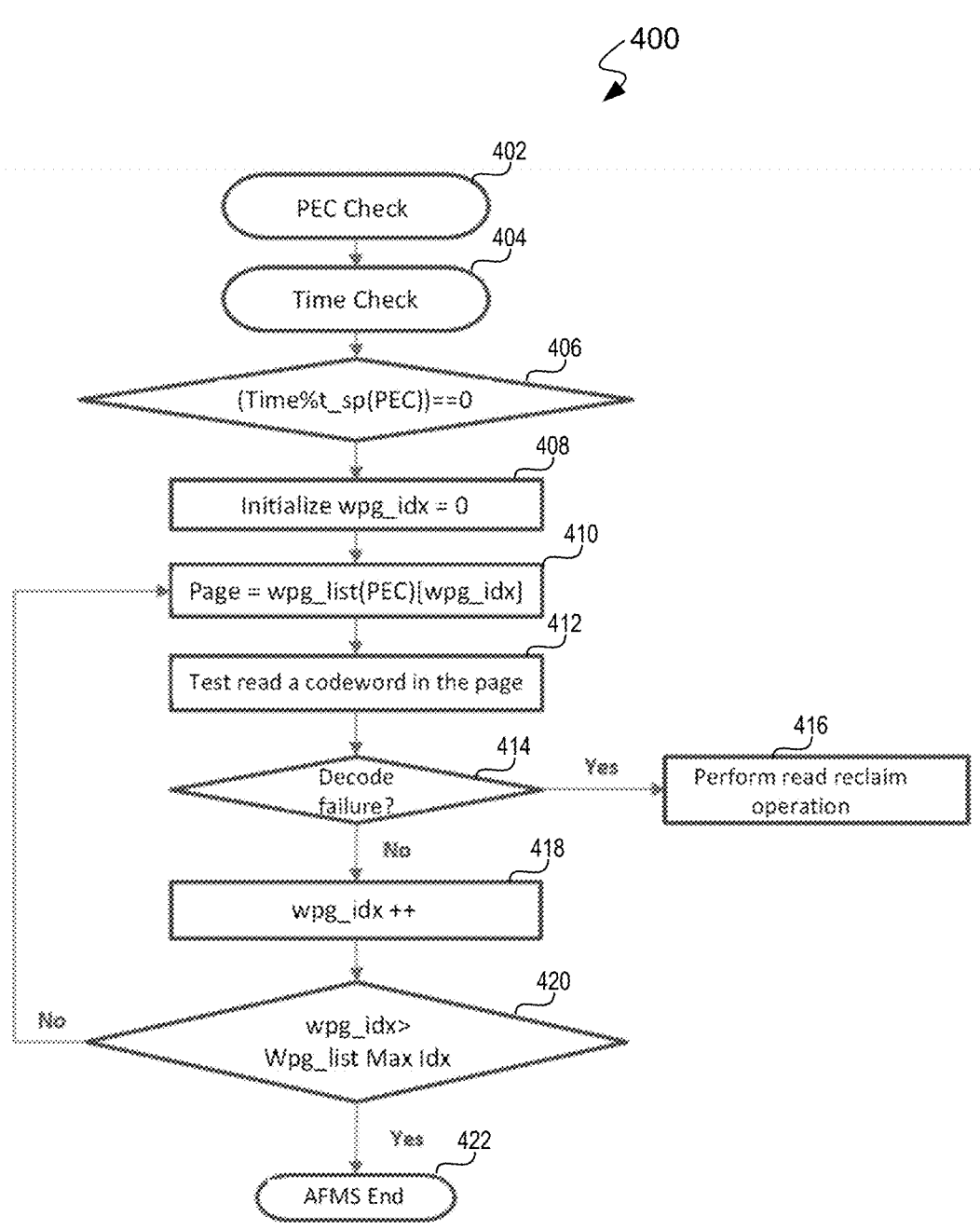
FIG. 4 illustrates an adaptive Flash media scan algorithm based on some embodiments of the disclosed technology.

FIG. 4 illustrates an adaptive Flash media scan algorithm based on some embodiments of the disclosed technology.

In an example TLC SSD, there are a total of, e.g., 300 superblocks (SBs), and each superblock contains, e.g., 60 weak pages that need to be scanned. The drive-level scan period is, e.g., 10 days, so all weak pages in the drive are scanned every 10 days. As shown in FIG. 3, the superblocks and the weak pages within each superblock may be scanned sequentially.

In some SSDs, the scan period and the list of weak pages are fixed throughout the entire lifespan of the SSD. While such SSDs can provide sufficient reliability to the drive at EOL, it can impact SOL QoS. In particular, it is difficult for such SSDs to meet the next-generation Gen6 QD1 4 KB random read QoS requirements, which is a very important metric for data center applications.

The disclosed technology can be implemented in some embodiments to address these issues using adaptive scan period and weak page scan list throughout the entire lifespan of the SSD. For example, the scan period and weak page scan list can be adjusted depending on where the drive is in its lifespan.

In some embodiments, the scan period is a function of the PEC zone. For example, the scan period can be denoted as "t_sp." During one scan period, all the weak pages in the drive are scanned once. In some implementations, at a low PEC zone, the t_sp value is larger. Table 1 below is an example of this function.

TABLE 1

| Scan Period as a Function of PEC Zone | | | | |
|---|---|---|---|---|
| PEC zone | Zone 1 | Zone 2 | Zone 3 | Zone 4 |
| t_sp | 30 days | 25 days | 20 days | 15 days |

In some embodiments, the weak page indices and list size are a function of the PEC zone. In some implementations, the term "PEC zone" can be used to indicate memory areas that have a certain PEC. In some implementations, the weak page indices and list size can be denoted as "wpg_list." In some implementations, wpg_list is an address table whose entries are weak page indices to be scanned. In some implementations, at a low PEC zone, the wpg_list size is smaller. For example, the wpg_list size is 24 for PEC zone 0-3K, 32 for PEC zone 3K-6K, 48 for PEC zone 6K-9K, and 64 for PEC zone 9K-12K. Table 2 below is an example of this function.

TABLE 2

| Weak Page List as a Function of PEC Zone | | | | |
|---|---|---|---|---|
| PEC zone | Zone 1 | Zone 2 | Zone 3 | Zone 4 |
| wpg_list | 24 | 32 | 48 | 64 |

As shown in FIG. 4, the new adaptive Flash media scan algorithm sequentially scans the weak pages in the wpg_list (PEC zone) for each superblock. If a decode failure occurs, a superblock read reclaim operation is requested.

Referring to FIG. 4, in some embodiments, an adaptive Flash media scan algorithm 400 includes, at 402, performing a program and erase cycle (PEC) check. For example, a memory controller checks a PEC value of a specific memory area.

In some embodiments, the adaptive Flash media scan algorithm 400 includes, at 404, performing a time check. For example, the memory controller obtains time information related to the scan period.

In some embodiments, the adaptive Flash media scan algorithm 400 includes, at 406, determining a scan period to be applied to the specific memory area. For example, the memory controller determines the value of t_sp by looking up a predetermined table (e.g., Table 1). As shown in Table 1 above, when the PEC value of a specific memory area falls within the range corresponding to Zone 1 (e.g., 0-3K), the value of t_sp is determined to be 30 days; when the PEC value of a specific memory area falls within the range corresponding to Zone 2 (e.g., 3K-6K), the value of t_sp is determined to be 25 days; when the PEC value of a specific memory area falls within the range corresponding to Zone 3 (e.g., 6K-9K), the value of t_sp is determined to be 20 days; and when the PEC value of a specific memory area falls within the range corresponding to Zone 4 (e.g., 9K-12K), the value of t_sp is determined to be 15 days.

In some embodiments, the adaptive Flash media scan algorithm 400 includes, at 408, initializing weak page indices. For example, the value of wpg_idx is set as 0. In some embodiments, the adaptive Flash media scan algorithm 400 includes, at 410, determining a weak page to be scanned from a weak page list wpg_list (PEC). For example, a page is selected from the weak page list wpg_list (PEC). For example, the wpg_list (PEC) may be the weak page list of the PEC zone. For example, the memory controller determines weak pages that need to be scanned corresponding to the list size of the weak page indices based on the PEC zone. For example, the memory controller determines weak pages in the specific memory area that need to be scanned corresponding to the list size of the weak page indices based on the PEC zone.

In some embodiments, the adaptive Flash (e.g., foreground) media scan algorithm 400 includes, at 412, performing a test read of the weak pages, and at 414, determining whether a decode failure has occurred, e.g., whether there is any uncorrectable ECC (UECC) in the weak pages scanned. If there is any decode failure (414), the adaptive Flash media scan algorithm 400 performs a read reclaim operation. For example, if there is any decode failure, the memory controller moves valid data from the specific memory area that includes the weak page with uncorrectable data, to a new memory area. If there is no decode failure (414), the adaptive Flash media scan algorithm 400 increases the weak page indices, and if the increased weak page indices are greater than the maximum list size (420), the adaptive Flash media scan algorithm 400 will terminate (422). If the increased weak page indices are less than the maximum list size (420), the adaptive Flash media scan algorithm 400 will proceed again from the operation 410.

In some embodiments, the above-discussed algorithm can be modified by adding more granularity to the scan period. For example, the adaptive Flash media scan algorithm 400 can record the highest fail bit count (FBC) during each scan period. Each PEC zone has FBC thresholds, FBC_TH1 (PEC zone) and FBC_TH2 (PEC zone), where FBC_TH1 (PEC zone)<FBC_TH2 (PEC zone). The initial values for the scan period in each PEC zone are given in Table 1. If the highest recorded FBC from the previous scan period is less than FBC_TH1 (PEC zone), the scan period is increased by a delta value (e.g., 1 day). If the highest recorded FBC from the previous scan period is greater than FBC_TH2 (PEC zone), the scan period is decreased by the delta value.

In some embodiments of the disclosed technology, the adaptive Flash media scan algorithm can improve the QoS of SSDs. In particular, it can enhance the SOL random read QoS of enterprise SSDs, which is very important for data center applications. In some embodiments of the disclosed technology, the adaptive Flash media scan algorithm can address the challenges arising from the very stringent next-generation QoS requirements.

FIG. 5 is a flow diagram that illustrates a method of operating a data storage system based on some embodiments of the disclosed technology.

In some embodiments, the method 500 includes, at 510, determining a program and erase cycle value of a particular memory area of a plurality of memory areas in the data storage system, at 520, determining a scan period corresponding to a cycle of a memory scanning operation based on the program and erase cycle of the particular memory area, at 530, determining a size of a list of memory pages of the particular memory area to be scanned within the determined scan period based on the program and erase cycle of the particular memory area, and, at 540, performing the memory scanning operation by scanning memory pages corresponding to the determined size of the list of memory pages within the determined scan period.

Figure 6:
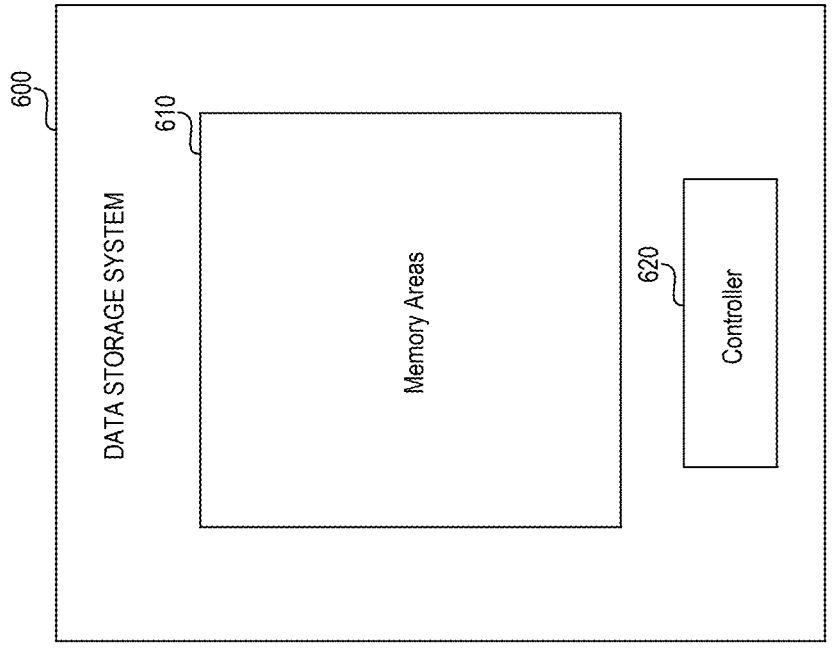
FIG. 6 illustrates an example of a data storage system implemented based on some embodiments of the disclosed technology.

FIG. 6 illustrates an example of a data storage system 600 implemented based on some embodiments of the disclosed technology.

In some embodiments, the data storage system 600 includes a plurality of memory areas 610 configured to store data; and a controller 620 coupled to a plurality of memory areas to control a memory scanning operation on the plurality of memory areas, wherein the memory scanning operation includes: determining a program and erase cycle value of a particular memory area of a plurality of memory areas in the data storage system; determining a scan period corresponding to a cycle of a memory scanning operation based on the program and erase cycle of the particular memory area; determining a size of a list of memory pages of the particular memory area to be scanned within the determined scan period based on the program and erase cycle of the particular memory area; and performing the memory scanning operation by scanning memory pages corresponding to the determined size of the list of memory pages within the determined scan period.

Therefore, various implementations of features of the disclosed technology can be made based on the above disclosure, including the examples listed below.

Example 1. A data storage system comprising: a plurality of memory areas configured to store data; and a controller coupled to a plurality of memory areas to control a memory scanning operation on the plurality of memory areas, wherein the memory scanning operation includes: determining a program and erase cycle value of a particular memory area of the plurality of memory areas; determining a scan period corresponding to a cycle of the memory scanning operation based on the program and erase cycle of the particular memory area; determining a size of a list of memory pages of the particular memory area to be scanned within the determined scan period based on the program and erase cycle of the particular memory area; and performing the memory scanning operation by scanning memory pages corresponding to the determined size of the list of memory pages within the determined scan period.

Example 2. The system of example 1, wherein the memory scanning operation comprises: determining whether the memory scanning operation to be performed on the particular memory area is within the determined scan period.

Example 3. The system of example 2, wherein the scanning operation is performed on the memory pages in the particular memory area, upon determination that the scanning operation to be performed on the memory pages is within the determined scan period.

Example 4. The system of example 1, wherein upon determining that the program and erase cycle value has a first program and erase cycle value, the memory scanning operation is performed within a first scan period, and upon determining that the program and erase cycle value has a second program and erase cycle value, the memory scanning operation is performed within a second scan period, wherein the first program and erase cycle value is smaller than the program and erase cycle value second value, and the first scan period is longer than the second scan period.

Example 5. The system of example 1, wherein upon determining that the program and erase cycle value has a first program and erase cycle value, the memory scanning operation is performed by scanning memory pages corresponding to a first size of the list of memory pages, and upon determining that the program and erase cycle value has a second program and erase cycle value, the memory scanning operation is performed by scanning memory pages corresponding to a second size of the list of memory pages, wherein the first program and erase cycle value is smaller than the program and erase cycle value second value, and the first size of the list of memory pages is smaller than the second size of the list of memory pages.

Example 6. The system of example 1, wherein performing the memory scanning operation includes: reading data stored in the memory pages corresponding to the determined size of the list of memory pages; determining whether the data contains errors and whether the errors are correctable; and initiating, upon determination that the data contains errors that are uncorrectable, a read reclaim operation.

Example 7. The system of example 6, wherein performing the memory scanning operation includes: adding, upon determination that the data contains errors that are uncorrectable, page indices corresponding to memory pages to be further scanned, to the list of memory pages; determining whether a size of the list of memory pages reaches a predetermined maximum size; and terminating, upon determination that the size of the list of memory pages reaches the predetermined maximum size, the scanning operation.

Example 8. The system of example 1, wherein the memory scanning operation further includes: storing a highest fail bit count of the memory pages determined based on the program and erase cycle of the particular memory area; and adjusting a subsequent scan period based on the highest fail bit count.

Example 9. The system of example 8, wherein adjusting the subsequent scan period based on the highest fail bit count includes increasing, upon determination that the highest fail bit count is less than a first fail bit count threshold, the subsequent scan period by a predetermined delta value.

Example 10. The system of example 8, wherein adjusting the subsequent scan period based on the highest fail bit count includes decreasing, upon determination that the highest fail bit count is less than a second fail bit count threshold, the subsequent scan period by a predetermined delta value.

Example 11. A method of operating a data storage system, the method comprising: determining a program and erase cycle value of a particular memory area of a plurality of memory areas in the data storage system; determining a scan period corresponding to a cycle of a memory scanning operation based on the program and erase cycle of the particular memory area; determining a size of a list of memory pages of the particular memory area to be scanned within the determined scan period based on the program and erase cycle of the particular memory area; and performing the memory scanning operation by scanning memory pages corresponding to the determined size of the list of memory pages within the determined scan period.

Example 12. The method of example 11, wherein the memory scanning operation further comprises: determining whether the memory scanning operation to be performed on the particular memory area is within the determined scan period.

Example 13. The method of example 12, wherein the scanning operation is performed on the memory pages in the particular memory area, upon determination that the scanning operation to be performed on the memory pages is within the determined scan period.

Example 14. The method of example 11, wherein upon determining that the program and erase cycle value has a first program and erase cycle value, the memory scanning operation is performed within a first scan period, and upon determining that the program and erase cycle value has a second program and erase cycle value, the memory scanning operation is performed within a second scan period, wherein the first program and erase cycle value is smaller than the program and erase cycle value second value, and the first scan period is longer than the second scan period.

Example 15. The method of example 11, wherein upon determining that the program and erase cycle value has a first program and erase cycle value, the memory scanning operation is performed by scanning memory pages corresponding to a first size of the list of memory pages, and upon determining that the program and erase cycle value has a second program and erase cycle value, the memory scanning operation is performed by scanning memory pages corresponding to a second size of the list of memory pages, wherein the first program and erase cycle value is smaller than the program and erase cycle value second value, and the first size of the list of memory pages is smaller than the second size of the list of memory pages.

Example 16. The method of example 11, wherein performing the memory scanning operation includes: reading data stored in the memory pages corresponding to the determined size of the list of memory pages; determining whether the data contains errors and whether the errors are correctable; and initiating, upon determination that the data contains errors that are uncorrectable, a read reclaim operation.

Example 17. The method of example 11, wherein performing the memory scanning operation includes: adding, upon determination that the data contains errors that are uncorrectable, page indices corresponding to memory pages to be further scanned, to the list of memory pages; determining whether a size of the list of memory pages reaches a predetermined maximum size; and terminating, upon determination that the size of the list of memory pages reaches the predetermined maximum size, the scanning operation.

Example 18. The method of example 11, wherein the memory scanning operation further includes: storing a highest fail bit count of the memory pages determined based on the program and erase cycle of the particular memory area; and adjusting a subsequent scan period based on the highest fail bit count.

Example 19. The method of example 18, wherein adjusting the subsequent scan period based on the highest fail bit count includes increasing, upon determination that the highest fail bit count is less than a first fail bit count threshold, the subsequent scan period by a predetermined delta value.

Example 20. The method of example 18, wherein adjusting the subsequent scan period based on the highest fail bit count includes decreasing, upon determination that the highest fail bit count is less than a second fail bit count threshold, the subsequent scan period by a predetermined delta value.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a," "an" and "the" are intended to include the plural forms as well, unless the context clearly indicates otherwise. Additionally, the use of "or" is intended to include "and/or," unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A data storage system comprising:
a plurality of memory areas configured to store data; and
a controller coupled to a plurality of memory areas to control a memory scanning operation on the plurality of memory areas, wherein the memory scanning operation includes:
determining a program and erase cycle value of a particular memory area of the plurality of memory areas;
determining a scan period corresponding to a cycle of the memory scanning operation based on the program and erase cycle value of the particular memory area;
determining a size of a list of memory pages of the particular memory area to be scanned within the determined scan period based on the program and erase cycle value of the particular memory area; and
performing the memory scanning operation by scanning memory pages corresponding to the determined size of the list of memory pages within the determined scan period,
wherein upon determining that the program and erase cycle value has a first program and erase cycle value, the memory scanning operation is performed within a first scan period, and upon determining that the program and erase cycle value has a second program and erase cycle value, the memory scanning operation is performed within a second scan period, wherein the first program and erase cycle value is smaller than the second program and erase cycle value, and the first scan period is longer than the second scan period.

2. The system of claim 1, wherein the memory scanning operation comprises: determining whether the memory scanning operation to be performed on the particular memory area is within the determined scan period.

3. The system of claim 2, wherein the scanning operation is performed on the memory pages in the particular memory area, upon determination that the scanning operation to be performed on the memory pages is within the determined scan period.

4. The system of claim 1, wherein upon determining that the program and erase cycle value has the first program and erase cycle value, the memory scanning operation is performed by scanning memory pages corresponding to a first size of the list of memory pages, and upon determining that the program and erase cycle value has the second program and erase cycle value, the memory scanning operation is performed by scanning memory pages corresponding to a second size of the list of memory pages, wherein the first size of the list of memory pages is smaller than the second size of the list of memory pages.

5. The system of claim 1, wherein performing the memory scanning operation includes:
reading data stored in the memory pages corresponding to the determined size of the list of memory pages;
determining whether the data contains errors and whether the errors are correctable; and
initiating, upon determination that the data contains errors that are uncorrectable, a read reclaim operation.

6. The system of claim 5, wherein performing the memory scanning operation includes:
adding, upon determination that the data contains errors that are uncorrectable, page indices corresponding to memory pages to be further scanned, to the list of memory pages;
determining whether a size of the list of memory pages reaches a predetermined maximum size; and
terminating, upon determination that the size of the list of memory pages reaches the predetermined maximum size, the scanning operation.

7. The system of claim 1, wherein the memory scanning operation further includes:
storing a highest fail bit count of the memory pages determined based on the program and erase cycle of the particular memory area; and
adjusting a subsequent scan period based on the highest fail bit count.

8. The system of claim 7, wherein adjusting the subsequent scan period based on the highest fail bit count includes increasing, upon determination that the highest fail bit count is less than a first fail bit count threshold, the subsequent scan period by a predetermined delta value.

9. The system of claim 7, wherein adjusting the subsequent scan period based on the highest fail bit count includes decreasing, upon determination that the highest fail bit count is less than a second fail bit count threshold, the subsequent scan period by a predetermined delta value.

10. A method of operating a data storage system, the method comprising:
determining a program and erase cycle value of a particular memory area of a plurality of memory areas in the data storage system;
determining a scan period corresponding to a cycle of a memory scanning operation based on the program and erase cycle value of the particular memory area;
determining a size of a list of memory pages of the particular memory area to be scanned within the determined scan period based on the program and erase cycle value of the particular memory area; and
performing the memory scanning operation by scanning memory pages corresponding to the determined size of the list of memory pages within the determined scan period,
wherein upon determining that the program and erase cycle value has a first program and erase cycle value, the memory scanning operation is performed within a first scan period, and upon determining that the program and erase cycle value has a second program and erase cycle value, the memory scanning operation is performed within a second scan period, wherein the first program and erase cycle value is smaller than the second program and erase cycle value, and the first scan period is longer than the second scan period.

11. The method of claim 10, wherein the memory scanning operation further comprises: determining whether the memory scanning operation to be performed on the particular memory area is within the determined scan period.

12. The method of claim 11, wherein the scanning operation is performed on the memory pages in the particular memory area, upon determination that the scanning operation to be performed on the memory pages is within the determined scan period.

13. The method of claim 10, wherein upon determining that the program and erase cycle value has the first program and erase cycle value, the memory scanning operation is performed by scanning memory pages corresponding to a first size of the list of memory pages, and upon determining that the program and erase cycle value has the second program and erase cycle value, the memory scanning operation is performed by scanning memory pages corresponding to a second size of the list of memory pages, wherein the first size of the list of memory pages is smaller than the second size of the list of memory pages.

14. The method of claim 10, wherein performing the memory scanning operation includes:

reading data stored in the memory pages corresponding to the determined size of the list of memory pages;

determining whether the data contains errors and whether the errors are correctable; and initiating, upon determination that the data contains errors that are uncorrectable, a read reclaim operation.

15. The method of claim 10, wherein performing the memory scanning operation includes:

adding, upon determination that the data contains errors that are uncorrectable, page indices corresponding to memory pages to be further scanned, to the list of memory pages;

determining whether a size of the list of memory pages reaches a predetermined maximum size; and terminating, upon determination that the size of the list of memory pages reaches the predetermined maximum size, the scanning operation.

16. The method of claim 10, wherein the memory scanning operation further includes:

storing a highest fail bit count of the memory pages determined based on the program and erase cycle of the particular memory area; and adjusting a subsequent scan period based on the highest fail bit count.

17. The method of claim 16, wherein adjusting the subsequent scan period based on the highest fail bit count includes increasing, upon determination that the highest fail bit count is less than a first fail bit count threshold, the subsequent scan period by a predetermined delta value.

18. The method of claim 16, wherein adjusting the subsequent scan period based on the highest fail bit count includes decreasing, upon determination that the highest fail bit count is less than a second fail bit count threshold, the subsequent scan period by a predetermined delta value.

19. A data storage system comprising:

a plurality of memory areas configured to store data; and a controller coupled to a plurality of memory areas to control a memory scanning operation on the plurality of memory areas, wherein the memory scanning operation includes:

determining a program and erase cycle value of a particular memory area of the plurality of memory areas;

determining a scan period corresponding to a cycle of the memory scanning operation based on the program and erase cycle value of the particular memory area;

determining a size of a list of memory pages of the particular memory area to be scanned within the determined scan period based on the program and erase cycle value of the particular memory area; and performing the memory scanning operation by scanning memory pages corresponding to the determined size of the list of memory pages within the determined scan period, wherein upon determining that the program and erase cycle value has a first program and erase cycle value, the memory scanning operation is performed by scanning memory pages corresponding to a first size of the list of memory pages, and upon determining that the program and erase cycle value has a second program and erase cycle value, the memory scanning operation is performed by scanning memory pages corresponding to a second size of the list of memory pages, wherein the first program and erase cycle value is smaller than the second program and erase cycle value, and the first size of the list of memory pages is smaller than the second size of the list of memory pages.

20. The system of claim 19, wherein performing the memory scanning operation includes:

reading data stored in the memory pages corresponding to the determined size of the list of memory pages;

determining whether the data contains errors and whether the errors are correctable; and initiating, upon determination that the data contains errors that are uncorrectable, a read reclaim operation.

* * * * *